US009052780B2

(12) United States Patent
Lu et al.

(10) Patent No.: US 9,052,780 B2
(45) Date of Patent: Jun. 9, 2015

(54) OPTICAL TOUCH SCREEN SYSTEM AND SENSING METHOD FOR THE SAME

(75) Inventors: Chih Hung Lu, Hsinchu (TW); Tzung Min Su, Hsinchu (TW); Chih Hsin Lin, Hsinchu (TW); Hsin Chia Chen, Hsinchu (TW); Cheng Nan Tsai, Hsinchu (TW)

(73) Assignee: Pixart Imaging Inc., Hsin-Chu (TW)

( * ) Notice: Subject to any disclaimer, the term of this patent is extended or adjusted under 35 U.S.C. 154(b) by 114 days.

(21) Appl. No.: 13/253,105

(22) Filed: Oct. 5, 2011

(65) Prior Publication Data

US 2012/0098795 A1 Apr. 26, 2012

(30) Foreign Application Priority Data

Oct. 20, 2010 (TW) ............................ 099135672 A

(51) Int. Cl.
*G06F 3/042* (2006.01)
*G06F 3/041* (2006.01)

(52) U.S. Cl.
CPC ............ *G06F 3/0428* (2013.01); *G06F 3/0416* (2013.01)

(58) Field of Classification Search
USPC .................................................. 345/173, 175
See application file for complete search history.

(56) References Cited

U.S. PATENT DOCUMENTS 4,507,557 A * 3/1985 Tsikos ....................... 250/341.7
6,480,187 B1 * 11/2002 Sano et al. .................... 345/175
6,498,602 B1 * 12/2002 Ogawa .......................... 345/173
6,563,491 B1 * 5/2003 Omura .......................... 345/173
6,927,386 B2 * 8/2005 Iwamoto et al. .............. 250/221
7,075,054 B2 * 7/2006 Iwamoto et al. .............. 250/221
7,932,899 B2 * 4/2011 Newton et al. ................ 345/175
2001/0028344 A1 * 10/2001 Iwamoto et al. .............. 345/175
2006/0202974 A1 * 9/2006 Thielman ...................... 345/175
2006/0232568 A1 * 10/2006 Tanaka et al. ................ 345/175
2006/0232830 A1 * 10/2006 Kobayashi .................... 358/448
2006/0284858 A1 * 12/2006 Rekimoto ..................... 345/173
2007/0052692 A1 * 3/2007 Gruhlke et al. ............... 345/175
2007/0132742 A1 * 6/2007 Chen et al. .................... 345/175

(Continued)

FOREIGN PATENT DOCUMENTS

CN 101663637 A 7/2009
CN 101477427 A 3/2010
CN 101882042 A 11/2010

OTHER PUBLICATIONS

Office Action with Search Report from China Patent Office in the Counterpart Application No. 201010552462.6, mailed Sep. 12, 2013, 6 pages of Office Action, and 2 pages of Search Report, in Chinese.

(Continued)

*Primary Examiner* — Temesgh Ghebretinsae
*Assistant Examiner* — Benyam Ketema
(74) *Attorney, Agent, or Firm* — Juan Carlos A. Marquez; Bacon & Thomas PLLC

(57) ABSTRACT

An optical touch screen system includes a touch screen, an image-sensing device, and a processing device. The image-sensing device generates a plurality of light-shielding information of an object at a plurality of time points. The processing device coupled to the image-sensing device includes a computing unit calculating a projected size difference value according to the plurality of light-shielding information, wherein the projected size difference value is a difference value between the projected sizes of the object on the touch screen at two different time points.

25 Claims, 9 Drawing Sheets

(56) References Cited

U.S. PATENT DOCUMENTS

| | | | | |
|---|---|---|---|---|
| 2007/0152986 | A1* | 7/2007 | Ogawa | 345/179 |
| 2008/0259053 | A1* | 10/2008 | Newton | 345/175 |
| 2008/0278460 | A1* | 11/2008 | Arnett et al. | 345/175 |
| 2009/0135162 | A1* | 5/2009 | Van De Wijdeven et al. | 345/175 |
| 2009/0219256 | A1* | 9/2009 | Newton | 345/173 |
| 2010/0193259 | A1* | 8/2010 | Wassvik | 178/18.09 |
| 2011/0050649 | A1* | 3/2011 | Newton et al. | 345/175 |
| 2011/0291944 | A1* | 12/2011 | Simmons et al. | 345/173 |

OTHER PUBLICATIONS

Office Action from State Intellectual Property Office of the P.R.C. in the corresponding Patent Application No. 201010552462.6 dated May 26, 2014, 7 pages in Chinese.

* cited by examiner

OPTICAL TOUCH SCREEN SYSTEM AND SENSING METHOD FOR THE SAME

CROSS-REFERENCE TO RELATED APPLICATION

The present application is based on, and claims priority from, Taiwan Application Serial Number 099135672, filed Oct. 20, 2010, the disclosure of which is hereby incorporated by reference herein in its entirety.

BACKGROUND OF THE INVENTION

1. Field of the Invention

The present invention relates to a touch screen system, and relates more particularly to an optical touch screen system that can detect movement perpendicular to a touch screen.

2. Description of the Related Art

A touch screen system generally includes a touch screen, and input operations are performed by contacting the touch screen with an object or a pointer. After the touch screen system detects the contact of the pointer with the touch screen, the position of the contact is calculated and coordinates are outputted for next operating procedure. There are various methods for detecting the contact of a pointer, one of which uses an optical imaging touch screen technology that detects the blocking of light for tracing the movement of a pointer on a touch screen.

An optical touch screen system using the optical imaging touch screen technology may include a touch screen, multiple image sensors disposed adjacent to the touch screen, and a plurality of reflecting components disposed on the sides of the touch screen. An object on the touch screen blocks a portion of light so that dark areas are formed on the image sensors. The coordinates of the object can be computed using the dark areas on the image sensors.

The optical detecting assembly including the image sensors and reflecting components (or active light emitting devices) has a definite thickness. Before an object approaching the touch screen contacts the touch screen, a dark area is formed on the image sensor and the optical touch screen system starts to calculate the coordinates of the object in response to the generation of the dark area. However, a significant difference always exists between the coordinates of the object calculated before the object contacts the touch screen and the coordinates of the object calculated after the object contacts the touch screen. Similarly, when the object is moved away from the touch screen, a significant difference exists between the coordinates of the object calculated before the object is moved from the touch screen and the coordinates of the object calculated after the object leaves the touch screen. Continuous output of erroneous coordinates may cause motion blur effect.

In addition, although current optical touch screen systems can accurately calculate the position of an object, they cannot detect the amount of force applied on the touch screen by the object. Thus, the application of the current optical touch screen systems is limited.

SUMMARY OF THE INVENTION

According to one aspect, the present invention provides an optical touch screen system and a sensing method for the same. The system can avoid outputting incorrect coordinates of an object before the object contacts a touch screen or leaves the touch screen.

According to another aspect, the present invention provides an optical touch screen system and a sensing method for the same. The system can simulate a virtual pressure by sensing the shape change caused by an object on a touch screen.

In accordance with the above aspects, the present invention proposes an optical touch screen system. The optical touch screen system comprises a touch screen, an image-sensing device, and a processing device. The image-sensing device generates a plurality of light-shielding information of an object at a plurality of time points. The processing device is coupled to the image-sensing device. The processing device comprises a computing unit that is configured to calculate a projected size difference value according to the plurality of light-shielding information, wherein the projected size difference value is a difference value between the projected sizes of the object on the touch screen at two different time points.

The present invention also proposes a sensing method for an optical touch screen system. The method comprises obtaining light-shielding information of an object at a plurality of time points, calculating a projected size difference value according to the light-shielding information, and determining the movement manner of the object according to the projected size difference value.

The present invention moreover proposes a sensing method for an optical touch screen system. The method comprises calculating a first projected size on a touch screen of a portion of an object in a detecting range of an image-sensing device at a first time point, calculating a second projected size on the touch screen of a portion of an object in the detecting range of the image-sensing device at a second time point, and calculating a projected size difference value of the first projected size and the second projected size.

To understand the above-described objectives better, characteristics and advantages of the present invention, embodiments, with reference to the drawings, are provided for detailed explanations.

BRIEF DESCRIPTION OF THE DRAWINGS

The invention will be described according to the appended drawings in which.

DETAILED DESCRIPTION OF THE INVENTION

Figure 1:
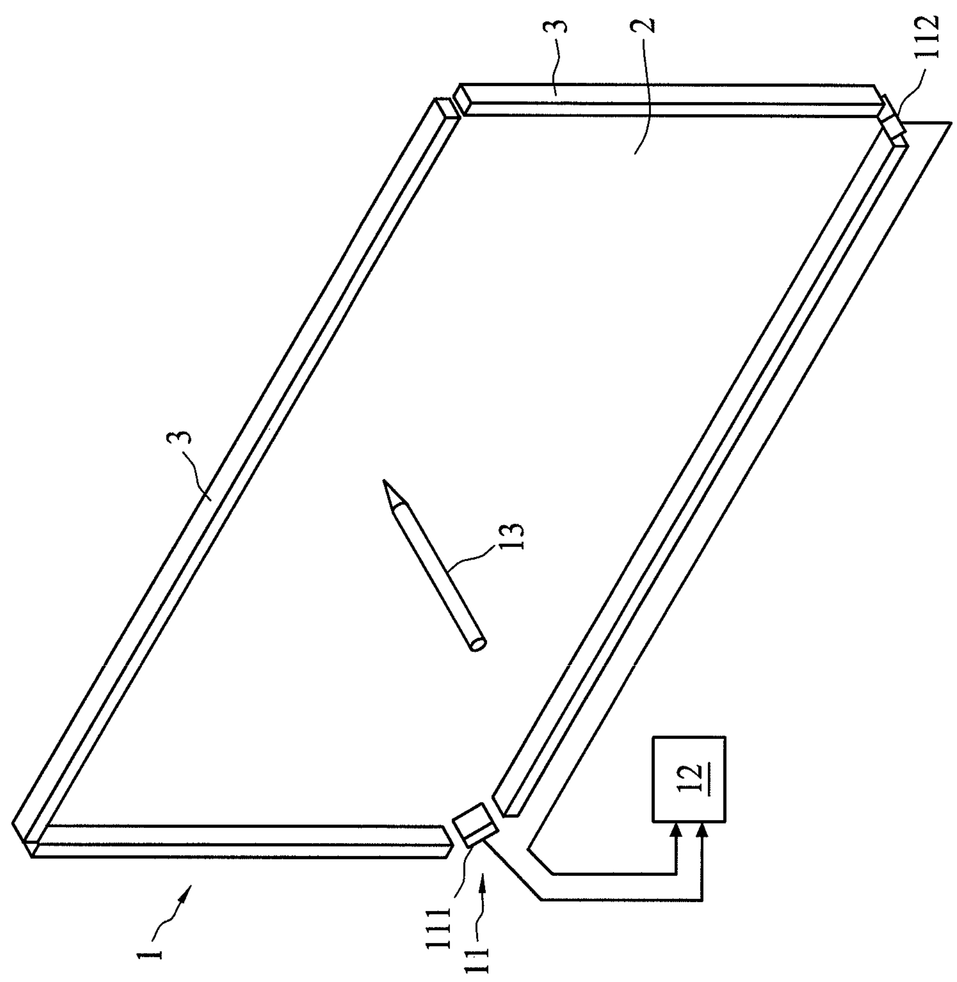
FIG. 1 is a perspective view showing an optical touch screen system according to one embodiment of the present invention.
Figure 2:
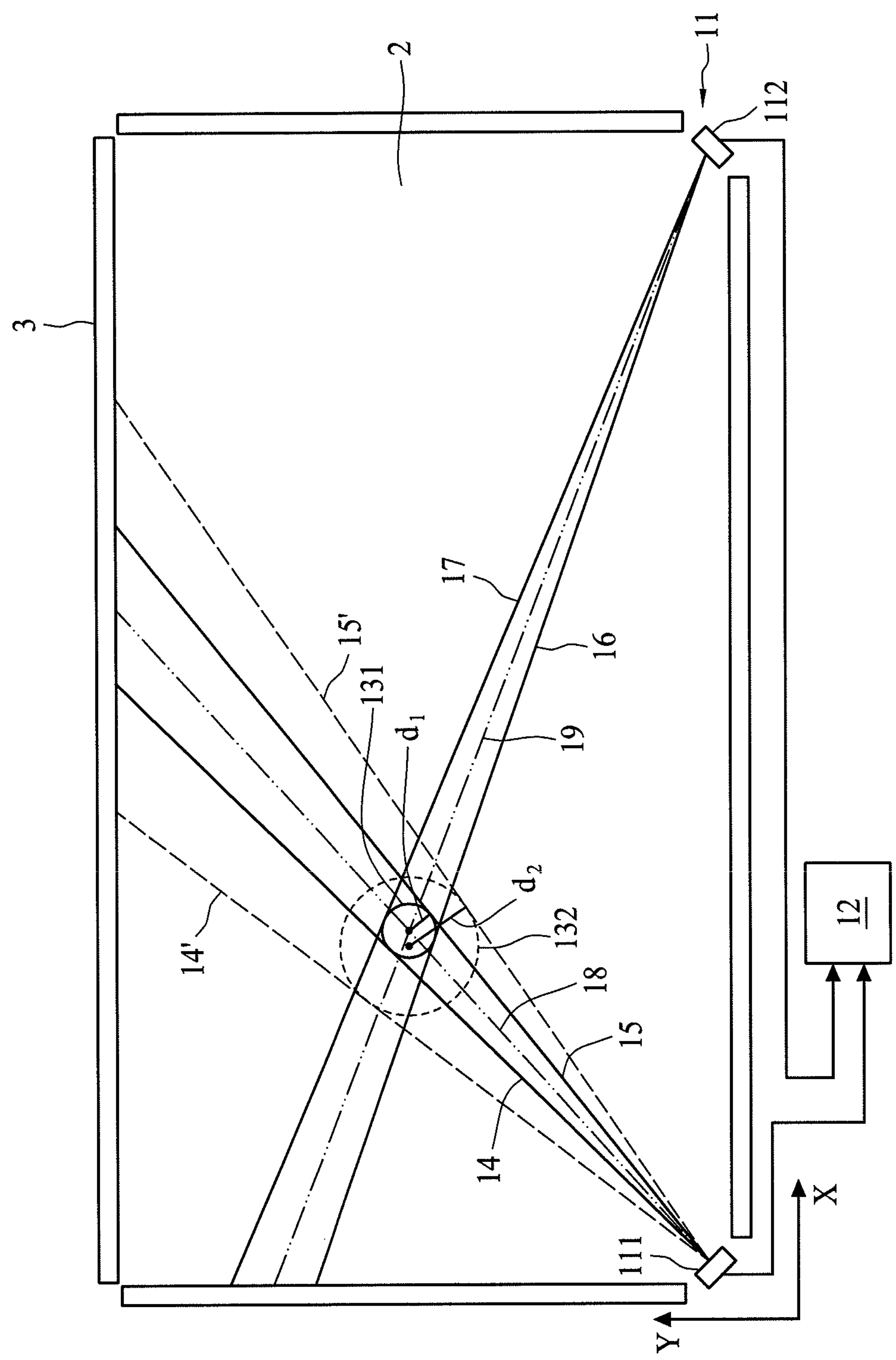
FIG. 2 is a top view showing an optical touch screen system according to one embodiment of the present invention.
Figure 3:
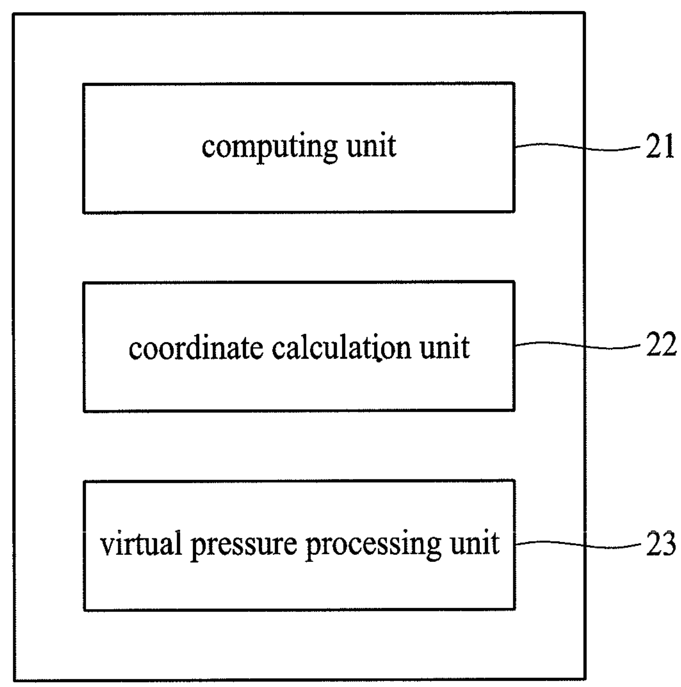
FIG. 3 is a block diagram showing a processing device according to one embodiment of the present invention.

Referring to FIGS. 1 and 2, an optical touch screen system 1 comprises an image-sensing device 11 and a processing device 12 coupled to the image-sensing device 11. The image-sensing device 11 is disposed to cooperate with a touch screen 2, and is configured to detect an object 13 on the touch screen 2. The processing device 12 calculates the coordinates of the object 13 on the touch screen 2 and the size of the projection of the object 13. The object 13 may comprise a pointer, a finger, or an element that can be applied to operate the optical touch screen system 1.

In one embodiment, elongated members 3 can be disposed on the sides of the touch screen 2, wherein the elongated member 3 can be a light reflecting member or an active light emitting member. The image-sensing device 11 may comprise two image-sensing units 111 and 112. The two image-sensing units 111 and 112 can be respectively disposed at two corners of the touch screen 2, each between two adjacent elongated members 3.

In one embodiment, the image-sensing unit 111 or 112 may be a two-dimensional CMOS (complementary metal-oxide semiconductor) image sensor. The image-sensing unit 111 or 112 may generate a plurality of image frames per second, such as 16 frames per second.

Referring to FIGS. 2, 3, 4A and 4B, the image-sensing device 11 can generate images of an object 13 at a plurality of time points, producing a plurality of light-shielding information **4*a* to 4*d* of the object 13. The processing device 12 may comprise a computing unit 21 configured to calculate a projected size difference value according to the plurality of light-shielding information 4*a* to 4*d* and a coordinate calculation unit 22 configured to compute the coordinates of the object 13**.

Figure 4A:
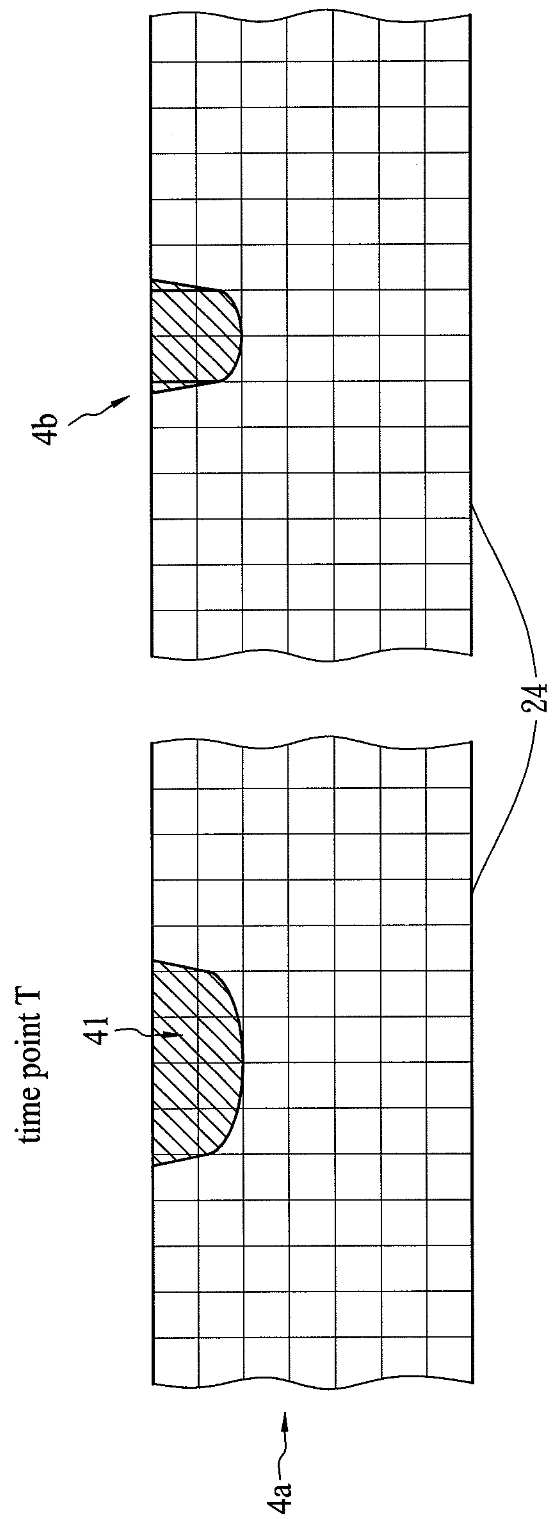
FIGS. 4A and 4B show light-shielding information according to one embodiment of the present invention.

Referring to FIGS. 2 and 4A, the two image-sensing units 111 and 112 disposed at the corners of the touch screen 2 can generate the light-shielding information **4*a* and 4*b*, which can be regarded as a group, at the same time point T. Using the group of light-shielding information 4*a* and 4*b*, the coordinate calculation unit 22 can calculate the coordinates of the object 13 on the touch screen 2 when the light-shielding information 4*a* and 4*b* is taken. Employing the embodiment of FIG. 4A as an example, the method of calculating the coordinates of the object 13 on the touch screen 2** is detailed as follows.

According to the light-shielding information **4*a*, the coordinate calculation unit 22 can determine the dividing lines (14 to 17) extending between dark and light areas and intersecting the edge of the object 13, wherein the dividing lines 14 and 15 extend from the image-sensing unit 111 and the dividing lines 16 and 17 extend from the image-sensing unit 112. Next, the coordinate calculation unit 22 can determine the extension lines 18 and 19 extending through the center of the object 13. Finally, the coordinate calculation unit 22 can calculate the coordinates of the object 13 by trigonometry, or can compute the intersection point of the extension lines 18 and 19 to obtain the coordinates of the object 13 on the touch screen 2. In addition to the above-mentioned embodiment, other conventional methods for computing the coordinates of the object 13 on the touch screen 2** can also be applied in the present invention. Because the methods are well known by skilled persons, detailed descriptions are not further provided here.

In one embodiment, the computing unit 21 may initially determine the projection 131 formed on the touch screen 2 by the portion of the object 13 in the detecting range of the image-sensing device 11. Next, the coordinate calculation unit 22 calculates the dividing lines 14 to 17 according to the projection 131. The representative coordinates of the projection 131 are computed in accordance with the afore-mentioned method, and the representative coordinates are the coordinates of the object 13 on the touch screen 2.

In addition to computing the coordinates of the object 13 on the touch screen 2, the processing device 12 can also analyze the projected size change of the object 13 after the light-shielding information (**4*a* and 4*c*) or (4*b* and 4*d*) generated by each image-sensing unit 111 or 112 at different time points (T and T+N) is obtained. The change can be utilized to determine the movement of the object 13 perpendicular to the touch screen 2, allowing the optical touch screen system 1** to react accordingly.

In an optical touch screen system 1, the size change of the projection of an object 13 usually occurs when the object 13 is moved toward or away from the touch screen 2, or when the object 13 is pressed against the touch screen 2. Normally, when the projected size change of the object 13 is not significant, the processing device 12 may output the coordinates of the object 13. When the projected size change of the object 13 is significant, it may indicate that the object 13 has moved away from or closer to the touch screen 2. To avoid outputting incorrect coordinates, the processing device 12 does not output the coordinates of the object 13. If the object 13 is not moved away from or toward the touch screen 2, and the projected sizes change to a certain extent, it may indicate that the object 13 is pressed against the contact surface of the touch screen 2. At such moment, the processing device 12 may output a pressure signal with a value in proportion to the projected size difference value.

Figure 4B:
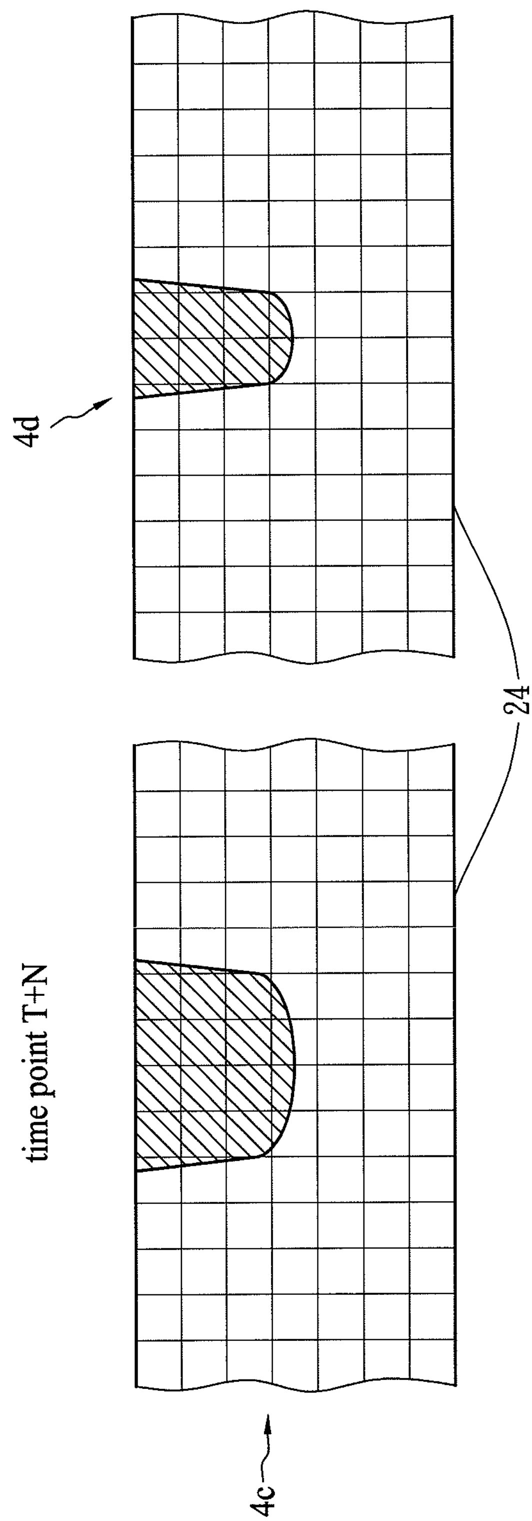
Figure 5A:
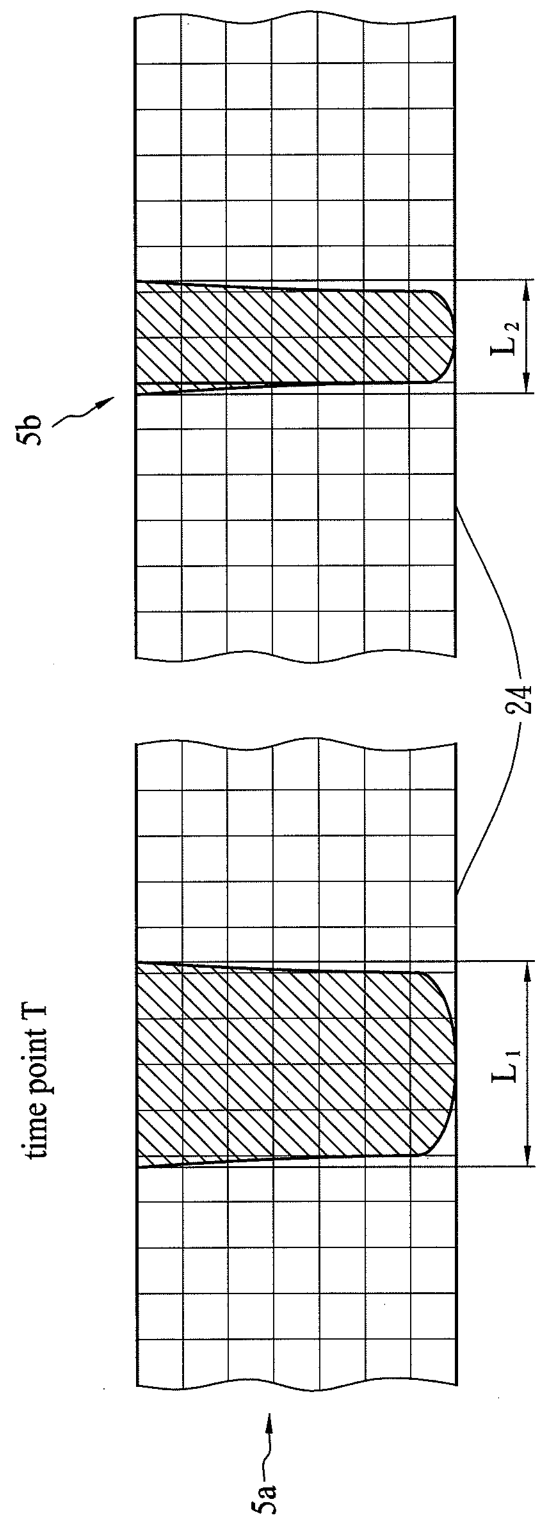
FIGS. 5A and 5B show light-shielding information according to another embodiment of the present invention.
Figure 5B:
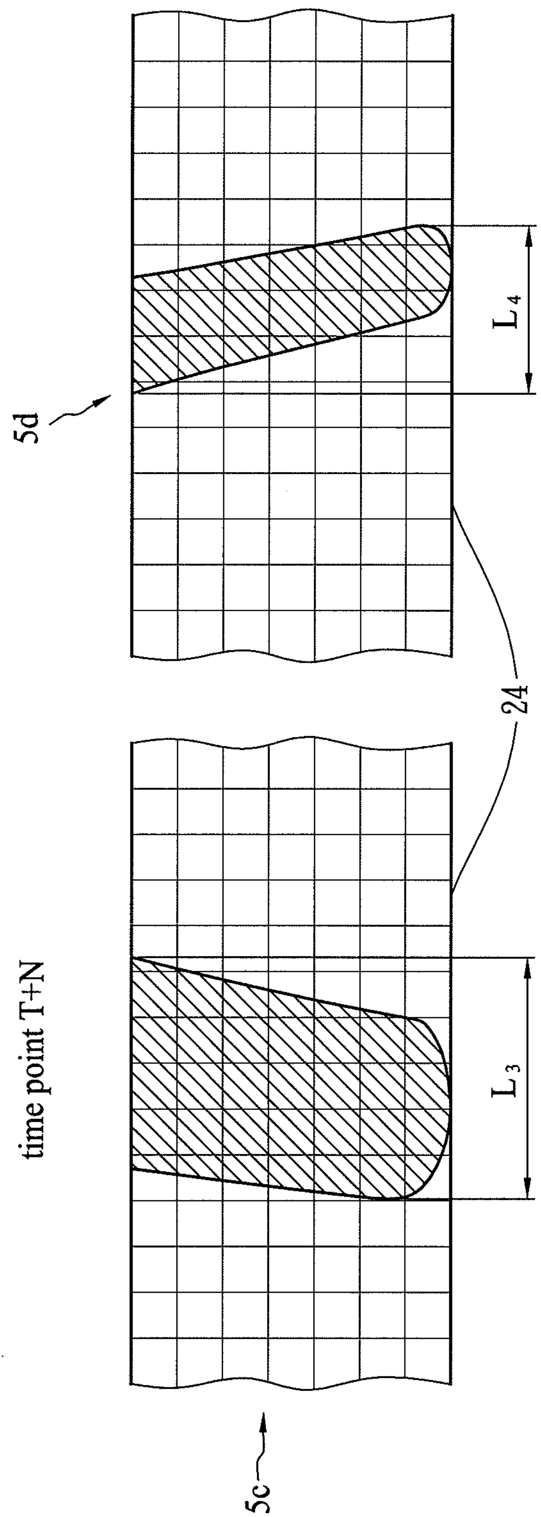

Referring to FIGS. 2, 4A, and 4B, a group of light-shielding information **4*a* and 4*b* is obtained at a time point T (a first time point) by the image-sensing units 111 and 112, and another group of light-shielding information 4*c* and 4*d* is obtained at a time point T+N by the image-sensing units 111 and 112, wherein N can be a positive number. According to the light-shielding information 4*a* and 4*b*, the processing device 12 can calculate the coordinates $(x_1, y_1)$ of the object 13 on the touch screen 2 at the time point T. Further, according to the light-shielding information 4*a*, the processing device 12 may determine the slope $m_1$ of the dividing line 15 and the equation of the dividing line 15**:

$$y=m_1x+b_1, \tag{1}$$

where $b_1$ is the y-axis intercept of Equation (1).

The portion of the object 13 detected by the image-sensing device 11 forms the projection 131 on the touch screen 2, which can be represented by a circle having a center with coordinates $(x_1, y_1)$ of the object 13 and being tangent with the dividing lines separating dark and light areas; however, the present invention is not limited to using a circle to represent the object 13. According to the above conditions, the computing unit 21 can calculate the projected size $S_1$ of the projection 131 on the touch screen 2 formed by the portion of the object 13 detected by the image-sensing device 11 at the time point T using Equation (2) as shown below:

$$S_1 = 2\times d_1 = 2\times\frac{|y_1 - m_1x_1 - b_1|}{\sqrt{1+m_1^2}}, \tag{2}$$

where $d_1$ represents the radius of the circle.

Similarly, according to the light-shielding information **4*c* and 4*d*, the processing device 12 may calculate the coordinates $(x_2, y_2)$ of the object 13 on the touch screen 2 at a time point T+N (the second time point), where N can be a number greater than 0. Further, according to the light-shielding information 4*c* provided by the image-sensing unit 111, the processing device 12 can determine the slope $m_2$ and the equation of a dividing line 14' or 15'**:

$$y=m_2x+b_2, \tag{3}$$

where $b_2$ represents the y-axis intercept of Equation (3).

In accordance with the above conditions, the processing device 12 can calculate the projected size $S_2$ of the projection 132 on the touch screen 2 formed by the portion of the object 13 detected by the image-sensing device 11 at the time point T+N using the following Equation (4).

$$S_2 = 2 \times d_2 = 2 \times \frac{|y_2 - m_2 x_2 - b_2|}{\sqrt{1 + m_2^2}}, \tag{4}$$

where $d_2$ represents the radius of the circle.

With the projected sizes $S_1$ and $S_2$ of the object 13, the processing device 12 can calculate the projected size difference value DS ($DS = S_1 - S_2$).

After the projected size difference value DS is obtained, the computing unit 21 can determine the manner of the movement perpendicular to the touch screen 2 by the projected size difference value DS. In the present embodiment, the object 13 is moved toward the touch screen 2, and therefore, the projected size difference value DS is significant. Under such a situation, the processing device 12 may determine whether coordinates have been outputted. Because the object 13 is moved toward the touch screen 2, no coordinates should have been outputted. Further, because the projected size difference value DS is positive, the processing device 12 compares the projected size difference value DS with a first threshold level having a positive value. Moreover, as time elapses, different projected size difference values are calculated, and when the processing device 12 obtains a projected size difference value DS, which is smaller than the first threshold level, the processing device 12 starts to output the coordinates of the object 13 on the touch screen 2. As such, incorrect coordinates are not outputted.

Analogously, in an embodiment in which an object 13 is moved away from the touch screen 2, before the object 13 is moved away, the processing device 12 may output coordinates continuously. After the object 13 is moved away, a negative calculated projected size difference value DS is obtained. Under such a circumstance, the processing device 12 uses a second threshold level having a negative value to compare with the projected size difference value DS. A projected size difference value DS that is smaller than the second threshold level may indicate that the object 13 is truly moved away, and the processing device 12 may stop outputting the coordinates of the object 13. As a result, the output of incorrect coordinates can be avoided, and motion blur effect does not occur on the touch screen 2.

In one embodiment, the modulus of the second threshold level is greater than the first threshold level.

The above first and second threshold levels can define in combination a numerical range. As such, the processing device 12 will determine whether the projected size difference value is in the numerical range or outside the numerical range, thereby deciding whether to output coordinates or not.

In addition, each light-shielding information (4_a_, 4_b_, 4_c_, or 4_d_) may comprise illumination information. For example, as shown in FIG. 4A, the illumination information is the average pixel intensity value of all pixels in the light-shielding range 41 on the light-shielding information 4_a_. After computing the illumination information of the light-shielding information 4_a_ to 4_d_ at the time points T and T+N, the computing unit 21 computes the illumination difference value DI with respect to the corresponding light-shielding information (4_a_ and 4_c_) or the illumination difference value DI with respect to the corresponding light-shielding information (4_b_ and 4_d_) based on the illumination information of the light-shielding information 4_a_ to 4_d_. Next, the processing device 12 may compare the illumination difference value DI with a third threshold level. If the illumination difference value DI is less than the third threshold level, the coordinates of the object 13 are outputted; otherwise, the coordinates of the object 13 are not outputted.

Referring to FIGS. 2, 3, 5A and 5B, the object 13 may be pressed against the touch screen 2. Under such a circumstance, the object 13 may incline, resulting in changing the projected sizes ($L_1$, $L_2$, $L_3$ and $L_4$) of the object 13, or may be deformed, causing the change of the projected sizes ($L_1$, $L_2$, $L_3$ and $L_4$). The change of the projected sizes ($L_1$, $L_2$, $L_3$ and $L_4$) can be obtained by calculating the difference value between the light-shielding information 5_a_ and the light-shielding information 5_c_ respectively obtained at the time points T and T+N or between the light-shielding information 5_b_ and the light-shielding information 5_d_ respectively obtained at the time points T and T+N.

Similarly, a group of light-shielding information 5_a_ and 5_b_ can be used to calculate the coordinates and projected size $d_3$ of the object 13 at the time point T, and another group of light-shielding information 5_c_ and 5_d_ can be used to calculated the coordinates and projected size $d_4$ of the object 13 at the time point T+N. Thereafter, a virtual pressure processing unit 23 included in the processing device 12 can convert the projected size difference value D ($D = d_3 - d_4$) of the projected sizes ($d_3$ and $d_4$) into a virtual contact pressure P.

In one embodiment, the virtual pressure processing unit 23 outputs a pressure signal with a value in proportion to the projected size difference value.

In another embodiment, the virtual pressure processing unit 23 of the processing device 12 comprises a plurality of numerical ranges and a plurality of pressure signals corresponding to the plurality of numerical ranges. The virtual pressure processing unit 23 compares the projected size difference value D with the plurality of numerical ranges, and outputs a pressure signal corresponding to the numerical range, within which the projected size difference value D lies. For example, the virtual contact pressure P can be determined by the following equations:

$$P = F(d_3 - d_4) = \begin{cases} \text{Low}, & \text{if } (d_3 - d_4) < Th3 \\ \text{Medium}, & \text{if } Th3 \le (d_3 - d_4) \le Th4 \\ \text{High}, & \text{if } (d_3 - d_4) \ge Th4, \end{cases}$$

where $$Th3 = \frac{1}{3} d_3 \text{ and } Th3 = \frac{1}{2} d_3.$$

In some embodiments, the image information of an object, including light-shielding information, can be processed such that the illumination value of at least one pixel in each column is acquired, or a sum or average of the illumination values of two or more pixels in each column is computed so that an illumination waveform distributed along the image can be obtained, which facilitates the analysis of the sites or positions of the light-shielding information 4_a_ to 4_d_ and 5_a_ to 5_d_.

Figure 6:
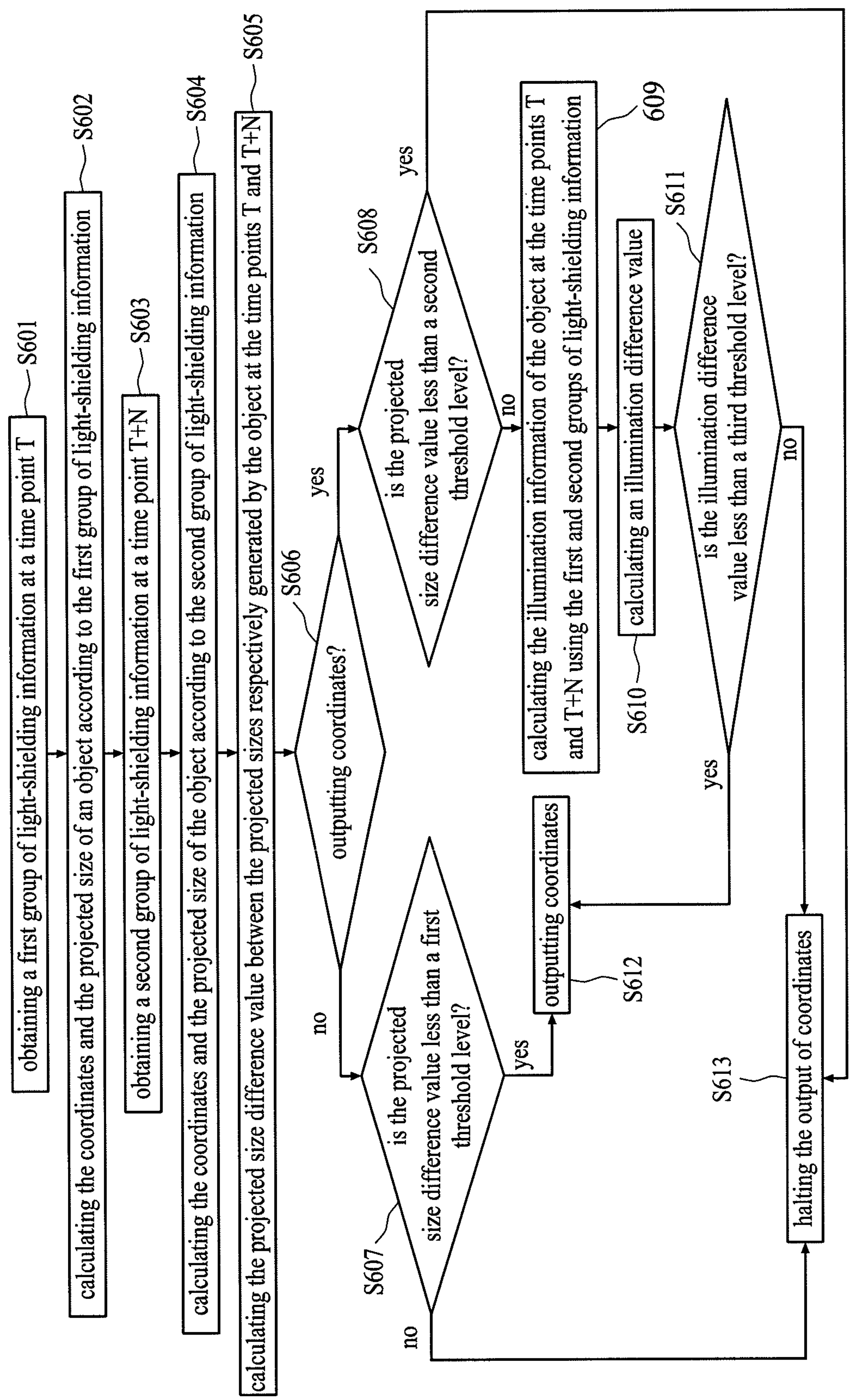
FIG. 6 is a flow chart showing a sensing method for an optical touch screen system according to one embodiment of the present invention.

FIG. 6 is a flow chart showing a sensing method for an optical touch screen system according to one embodiment of the present invention. Referring to FIGS. 1, 2 and 6, at Step S601, a first group of light-shielding information is obtained at a time point T, wherein the first group of light-shielding information is formed with the light-shielding information separately generated by two image-sensing units 111 and 112. Each group of light-shielding information comprises a light-shielding range formed by a portion of the object 13 in the detecting range of the image-sensing device 11.

In Step S602, the coordinates and the projected size of the object 13 at the time point T are calculated according to the first group of light-shielding information. The coordinates and the projected size of the object 13 can be computed using Equations (1) and (2), or Equations (3) and (4).

In Step S603, a second group of light-shielding information is obtained at a time point T+N, wherein the second group of light-shielding information is formed with the light-shielding information separately generated by two image-sensing units 111 and 112. Each group of light-shielding information comprises a light-shielding range formed by a portion of the object 13 in the detecting range of the image-sensing device 11.

In Step S604, the coordinates and the projected size of the object 13 at the time point T+N are calculated according to the second group of light-shielding information. The coordinates and the projected size of the object 13 can be computed using Equations (1) and (2), or Equations (3) and (4).

In Step S605, the projected size difference value between the projected sizes generated by the object 13 at the time points T and T+N is calculated.

In Step S606, whether the coordinates of the object 13 have been output is examined. If the coordinates have been output, it may be indicated that the object 13 contacted the touch screen 2 at the time point T; if no coordinates has been output, it may be indicated that the object 13 did not contact the touch screen 2 at the time point T.

In Step 607, if the system does not output coordinates and the object is moved toward the touch screen 2, the projected size difference value is positive and compared with a first threshold level having a positive value. If the projected size difference value is greater than the first threshold level, it may be indicated that the object 13 has moved significantly in a direction perpendicular to the touch screen 2. Such significant movement may cause the computed coordinates and the projected size difference value to have large errors; thus, the coordinates of the object 13 will not be outputted (in Step S613). If the movement of the object 13 perpendicular to the touch screen 2 slows down from the time point T to the time point T+N, the projected size difference value may accordingly become smaller. When the projected size difference is less than the first threshold level, the coordinates of the object 13 may start to be outputted because accurate coordinates can be obtained (in Step S612).

In Step S608, if coordinates have been output and the projected size difference becomes larger, it may be indicated that the object 13 has moved away from the touch screen 2. Under such a circumstance, the projected size difference value obtained is negative and compared with a second threshold level having a negative value. When the projected size difference value is less than the second threshold level or the modulus of the projected size difference value is greater than the modulus of the second threshold level, Step S613 is executed and the output of the coordinates of the object 13 is halted; otherwise, Step S609 is executed.

In Step S609, a first group of light-shielding information is used to calculate the illumination information of the object 13 at the time point T, and a second group of light-shielding information is used to calculate the illumination information of the object 13 at the time point T+N. The illumination information is the average pixel intensity value of all pixels in a light-shielding range on the light-shielding information.

In Step S610, an illumination difference value is calculated according to the illumination information calculated in Step S609.

In Step S611, the illumination difference value is compared with a third threshold value. If the illumination difference value is less than the third threshold value, the coordinates of the object 13 are then output; if the illumination difference value is greater than the third threshold value, the output of the coordinates of the object 13 is halted.

Figure 7:
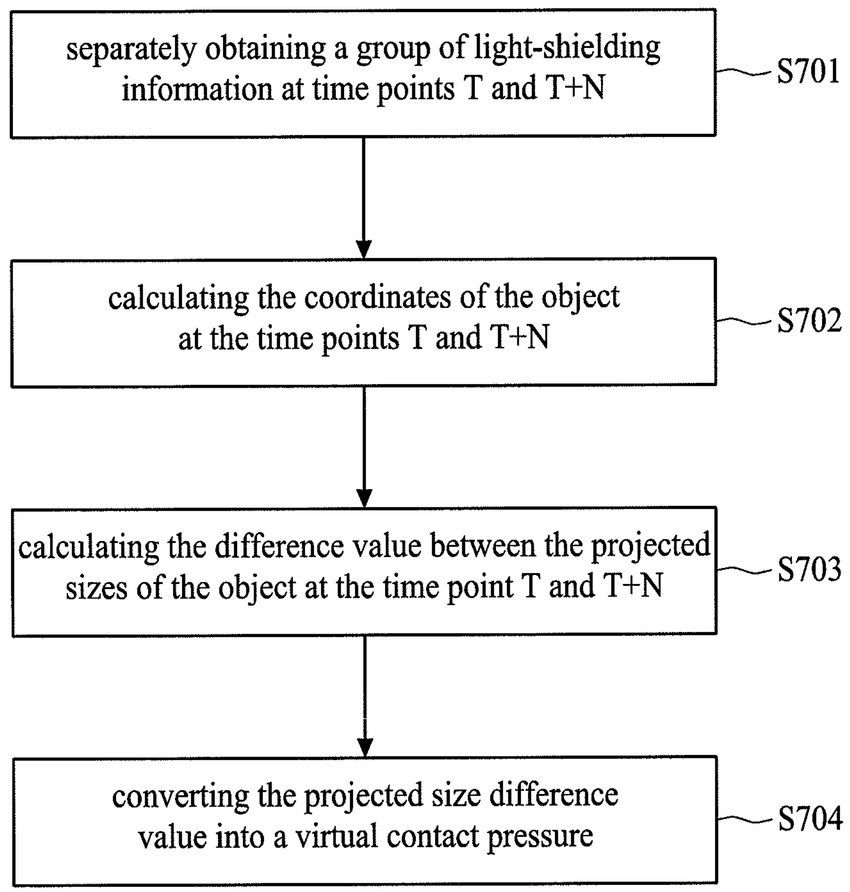
FIG. 7 is a flow chart showing a method for sensing force on an optical touch screen system according to one embodiment of the present invention.

FIG. 7 is a flow chart showing a method for sensing pressure force on an optical touch screen system according to one embodiment of the present invention. In Step S701, a first group of light-shielding information is obtained at a time point T, and a second group of light-shielding information is obtained at a time point T+N.

In Step S702, the first group of light-shielding information is used to calculate the coordinates of the object 13 at the time point T, and the second group of light-shielding information is used to calculate the coordinates of the object 13 at the time point T+N.

In Step S703, the first group of light-shielding information and the coordinates of the object 13 at the time point T are used to calculate a projected size of the object 13, and the second group of light-shielding information and the coordinates of the object 13 at the time point T+N are used to calculate another projected size of the object 13. Next, the difference value between the two projected sizes produced by the object 13 at time points T and T+N is calculated.

In Step S704, the difference value between the two projected sizes produced by the object 13 at time points T and T+N is then converted into a virtual contact pressure.

The above-described embodiments of the present invention are intended to be illustrative only. Numerous alternative embodiments may be devised by persons skilled in the art without departing from the scope of the following claims.

What is claimed is:

1. An optical touch screen system comprising:

a touch screen;

an image-sensing device generating a plurality of light-shielding information of an object at a plurality of time points; and a processing device coupled to the image-sensing device, comprising a computing unit configured to generate a projected size difference value according to the plurality of light-shielding information, wherein the projected size difference value is generated by subtracting a first projected size of the object on the touch screen from a second projected size of the object at two different time points, wherein a projected size is a diameter of a circle representing a projection of the object, wherein the processing device comprises a coordinate calculation unit configured to compute coordinates of the object according to the plurality of light-shielding information generated by the image-sensing device when the image-sensing device detects the object, and wherein the processing device does not output the coordinates when the projected size difference value is larger than a threshold level.

2. The optical touch screen system of claim 1, wherein the image-sensing device comprises a first image-sensing unit and a second image-sensing unit, and the first and second image-sensing units generate a plurality of groups of light-shielding information at the plurality of time points, wherein the coordinate calculation unit computes the coordinates of the object according to the plurality of groups of light-shielding information.

3. The optical touch screen system of claim 1, wherein the processing device outputs the coordinates when the projected size difference value is not larger than the threshold level.

4. The optical touch screen system of claim 1, wherein the processing device has a numerical range, and the processing device outputs the coordinates when the projected size difference value is within the numerical range.

5. The optical touch screen system of claim 4, wherein the numerical range comprises an upper bound greater than zero and a lower bound less than zero, wherein the modulus of the lower bound is greater than the upper bound.

6. The optical touch screen system of claim 1, wherein the light-shielding information comprises illumination information of an image produced by the image-sensing device when the image-sensing device detects the object, and the computing unit calculates an illumination difference value according to the plurality of illumination information.

7. The optical touch screen system of claim 1, wherein the processing device outputs a pressure signal with a value in proportion to the projected size difference value.

8. The optical touch screen system of claim 1, wherein the processing device has a plurality of numerical ranges and a plurality of pressure signals corresponding to the plurality of numerical ranges, and the processing device compares the projected size difference value with the plurality of numerical ranges and outputs a corresponding one of the pressure signals.

9. A sensing method for an optical touch screen system, comprising the steps of:

obtaining a plurality of light-shielding information of an object at a plurality of time points;

generating a projected size difference value according to the plurality of light-shielding information, wherein a projected size is a diameter of a circle representing a projection of the object at a time point, the projected size difference value is generated by subtracting a first projected size of the object at one time point from a second projected size of the object at another time point;

determining the movement manner of the object according to the projected size difference value;

computing coordinates of the object according to the plurality of light-shielding information; and stopping output of the coordinates of the object when the modulus of the projected size difference value is less than a first threshold level.

10. The sensing method of claim 9, further comprising the steps of:

obtaining a first group of light-shielding information;

determining first coordinates of the object according to the first group of light-shielding information; and calculating a first distance between the first coordinates and a first dividing line intersecting an edge of the object for determining a first projected size of the object.

11. The sensing method of claim 10, further comprising the steps of:

obtaining a second group of light-shielding information;

determining second coordinates of the object according to the second group of light-shielding information; and calculating a second distance between the second coordinates and a second dividing line intersecting an edge of the object for determining a second projected size of the object.

12. The sensing method of claim 9, further comprising the steps of:

providing a numerical range; and outputting the coordinates of the object when the projected size difference value is within the numerical range.

13. The sensing method of claim 12, wherein the numerical range comprises an upper bound greater than zero and a lower bound less than zero, wherein the modulus of the lower bound is greater than the upper bound.

14. The sensing method of claim 13, further comprising the steps of:

determining a first illumination information of the object by a first group of light-shielding information;

determining a second illumination information of the object by a second group of light-shielding information;

computing an illumination difference between the first and second illumination information; and outputting the coordinates of the object when the modulus of the projected size difference value is greater than the modulus of the lower bound and the modulus of the illumination difference is less than a second threshold level.

15. The sensing method of claim 13, further comprising a step of outputting a pressure signal with a value in proportion to the projected size difference value.

16. The sensing method of claim 13, further comprising the steps of:

providing a plurality of numerical ranges and a plurality of pressure signals in accordance with the plurality of numerical ranges; and finding the numerical range in which the projected size difference value lies and outputting the corresponding pressure signal.

17. The sensing method of claim 16, further comprising the steps of:

obtaining a first group of light-shielding information;

determining first coordinates of the object by the first group of light-shielding information; and calculating a first distance between the first coordinates and a first dividing line intersecting an edge of the object for determining a first projected size of the object.

18. The sensing method of claim 17, further comprising the steps of:

obtaining a second group of light-shielding information;

determining second coordinates of the object by the second group of light-shielding information; and calculating a second distance between the second coordinates and a second dividing line intersecting an edge of the object for determining a second projected size of the object.

19. The sensing method of claim 15, further comprising the steps of:

obtaining a first group of light-shielding information;

determining first coordinates of the object by the first group of light-shielding information; and calculating a first distance between the first coordinates and a first dividing line intersecting an edge of the object for determining a first projected size of the object.

20. The sensing method of claim 19, further comprising the steps of:

obtaining a second group of light-shielding information;

determining second coordinates of the object by the second group of light-shielding information; and calculating a second distance between the second coordinates and a second dividing line intersecting an edge of the object for determining a second projected size of the object.

21. A sensing method for an optical touch screen system, comprising the steps of:

calculating a first projected size, on a touch screen, of a portion of an object in a detecting range of an image-sensing device at a first time point, wherein the first projected size is a diameter of a first circle representing a projection of the portion of the object;

calculating a second projected size, on the touch screen, of a portion of an object in the detecting range of the image-sensing device at a second time point, wherein the second projected size is a diameter of a second circle representing a projection of the portion of the object;

generating a projected size difference value by subtracting the first projected size from the second projected size;

calculating coordinates of the object; and stopping output of the coordinates of the object when the modulus of the projected size difference value is larger than a first threshold level.

22. The sensing method of claim 21, further comprising the steps of:

providing a numerical range; and outputting the coordinates of the object when the projected size difference value is within the numerical range.

23. The sensing method of claim 22, wherein the numerical range comprises an upper bound greater than zero and a lower bound less than zero, and the modulus of the lower bound is greater than the upper bound.

24. The sensing method of claim 21, further comprising a step of outputting a pressure signal with a value in proportion to the projected size difference value.

25. The sensing method of claim 21, further comprising the steps of:

providing a plurality of numerical ranges and a plurality of pressure signals corresponding to the plurality of numerical ranges; and finding the numerical range in which the projected size difference value lies and outputting the corresponding pressure signal.

* * * * *